United States Patent

Murase

[11] 4,274,111
[45] Jun. 16, 1981

[54] COLOR FACSIMILE SIGNAL TRANSMISSION SYSTEM

[75] Inventor: Katsuo Murase, Hachioji, Japan

[73] Assignee: Ricoh Co., Ltd., Tokyo, Japan

[21] Appl. No.: 140,113

[22] Filed: Apr. 14, 1980

[30] Foreign Application Priority Data

Apr. 18, 1979 [JP] Japan ................................. 54-47550

[51] Int. Cl.³ .................... H04N 1/46; H04N 9/36; H04N 1/41
[52] U.S. Cl. ...................................... 358/75; 358/15; 358/262
[58] Field of Search ...................... 358/12, 13, 15, 75, 358/262

[56] References Cited

U.S. PATENT DOCUMENTS

| | | | |
|---|---|---|---|
| 3,538,246 | 11/1970 | Macovski et al. | 358/262 |
| 3,795,765 | 3/1974 | DeGrout et al. | 358/262 |

*Primary Examiner*—John C. Martin
*Attorney, Agent, or Firm*—Burgess, Ryan and Wayne

[57] ABSTRACT

At the transmitting side, a composite signal is synthesized from a color signal of a higher level and a black-and-white signal of a lower level, the composite binary signal is converted into a three-value signal, and this three-value signal is modulated and transmitted. At the receiving side, the received signal is demodulated and converted into a binary signal, its level is detected, and the color signal and the black-and-white signal are separated.

3 Claims, 5 Drawing Figures

COLOR FACSIMILE SIGNAL TRANSMISSION SYSTEM

BACKGROUND OF THE INVENTION

The present invention relates to a color facsimile signal transmission system with an extremely simple circuit construction which is capable of transmitting color signals as well as black-and-white facsimile signals.

Facsimile signal transmission in this country is divided into audio frequency band transmission which utilizes the cleared channel of the Nippon Telegraph & Telephone Public Corporation and transmission which utilizes a cleared channel of a wide band of 12 to 240 KHz. The subscription facsimile utilizing the public telephone exchange network is divided into a system wherein transmission is effected by switching the peripheral circuit from a telephone receiver to a facsimile device, and a system wherein a facsimile signal is acoustically coupled to the transmitter and the receiver of a telephone.

The facsimile using the telephone circuit utilizes, in general, transmission systems of DSB (double side band wave) of AM and VSB (vestigial side band wave). For high speed transmission, various systems have been proposed such as a system wherein a binary black-and-white facsimile signal is converted into a three-value signal, or a system wherein the lengths of white and black components (run lengths) of a facsimile signal are encoded along with adjacent scanning lines for transmission.

In a color facsimile system, an original color image is resolved into three colors for transmission. For use of the image for an original plate for color printing at the receiving side, the three colors are separately received on black-and-white film. For use as an original image for color television broadcasting or for color photography, the three colors are combined and recorded on media such as color film.

As a conventional system for transmitting color facsimile signals, a line sequential system has been proposed wherein color information for each image element of a transmitting image is resolved into three primary colors, and signals representative of these three primary colors are sequentially transmitted in each scanning line. However, with this system, the transmission time corresponding to each scanning line is three times the usual case. Further, these signals cannot be transmitted in a compatible manner with usual black-and-white facsimile signals.

Another conventional system has been proposed wherein a code for differentiating colors is added to the initial part of each image element. However, with this system, the transmission speed is also slow as compared with usual black-and-white facsimile signals. Further, these signals cannot be transmitted in a compatible manner with usual black-and-white facsimile signals.

Another transmission system is known wherein the polarities of the black-and-white signal and the color signal are opposite, and the signals are transmitted in a three-value form (Japanese Patent Publication No. 52-31607). In this system, a phase synchronizing signal (FIG. 1(a)), a first color signal (FIG. 1(b)), and a signal (FIG. 1(d)) derived by inverting a second color signal are superposed at the transmitting side to obtain an output three-value signal of $+1$, 0 and $-1$. This output signal is amplified and transmitted to the receiving side. The receiving side separates the first and second color signals depending on whether the output of an entire-phase envelope detector is "1" or "0".

However, since one polarity of the three-value signal is used for the color signal, the black-and-white facsimile signal becomes essentially the same as a binary signal. Thus, the transmission time becomes longer as compared with the case of a general three-value signal.

Further, this system has been defective in that it cannot be used with the AM three-value system designed for black-and-white signals.

SUMMARY OF THE INVENTION

Accordingly, the object of the present invention is to provide a color facsimile signal transmission system wherein the transmission time of color information is the same as the transmission time of black-and-white information utilizing AM three-value signals, the circuit construction is simple, and the system can also transmit usual black-and-white facsimile signals.

The preferred embodiments of the present invention will now be described with reference to the accompanying drawings.

DESCRIPTION OF THE PREFERRED EMBODIMENTS

FIGS. 2(a) and 2(b) are flow charts for the transmitting and receiving sides, respectively, of the signal transmission system of the present invention.

A preferred embodiment will now be described with reference to a two-color facsimile signal transmission system wherein red information is included in the original image.

First, at the transmitting side, the black-and-white information and the red information of an image are scanned by a light source for read scanning. The black-and-white image signal W.B., derived by photoelectric conversion, and the color image signal COL, derived by a color resolving filter (red signal in this case), are supplied to a level setting adder circuit 1.

The level setting adder circuit 1 sets the red color signal R at a level higher than that of the white color signal W, and superimposes it on the black-and-white signal. That is, the level setting adder circuit 1 sets the red color signal R at a level higher than that of the white color signal W and sets the black color signal B at a level lower than that of the white color signal W by adjusting the values of resistors R1 and R2 so that R2>R1 when the red color signal R and the black-and-white signal W.B of opposite polarities are supplied as shown in FIG. 4.

Figure 1:
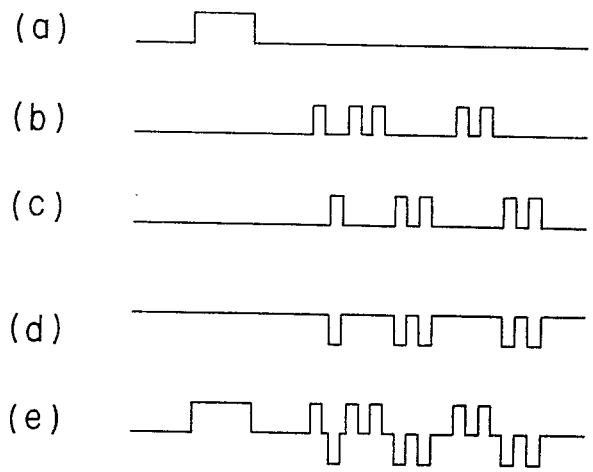
FIG. 1 is a view illustrating a conventional two-color type facsimile signal transmission system.
Figure 3:
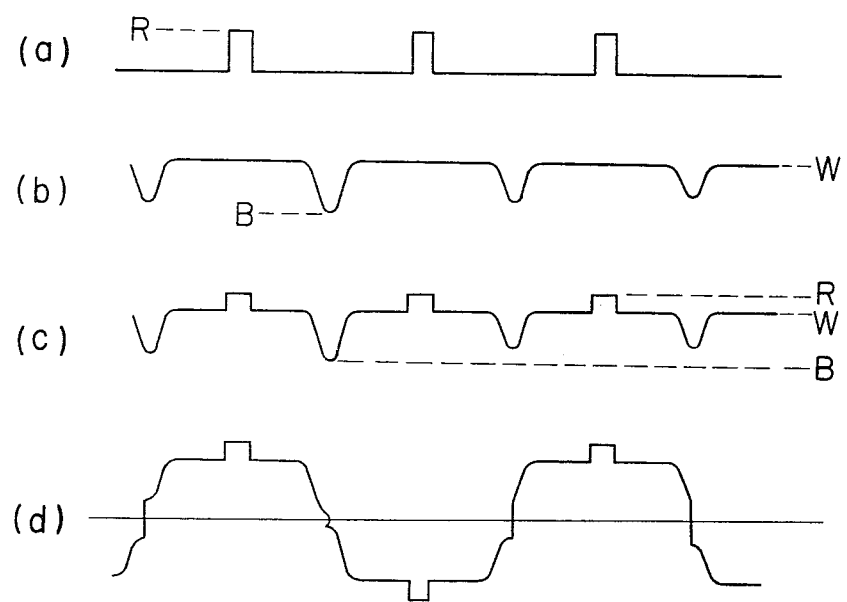
FIG. 3 is an operating timing chart of FIG. 2.

The facsimile signal derived by repeatedly scanning the black-and-white original image is a ladder-shaped wave similar to a rectangular wave, and it is set as a white color signal W of a reference level as shown in FIG. 3(b) and as a black signal B of a level lower than the reference level, depending on the darkness of the original image.

In FIG. 3(a) is shown the red color signal R separated from the black-and-white signal W.B by means such as a color filter. The level setting circuit sets the red color signal R at a reference level which is higher than that of the white color signal W.

Figure 4:
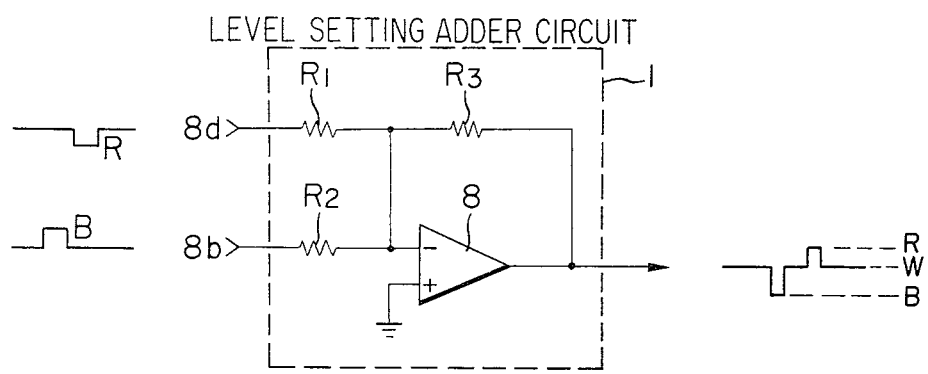
FIG. 4 is a circuit diagram of the level setting adder circuit of FIG. 2.

Thus, the red signal R as shown in FIG. 3(a) and the black-and-white signal W.B as shown in FIG. 3(b) are combined by the adder 1 as shown in FIG. 4, and a composite signal wave as shown in FIG. 3(c) is obtained.

The adder circuit 1 as shown in FIG. 4 has an operational amplifier 8 whose non-inverting input terminal is grounded. The red color signal R is applied at an input terminal 8a through the resistor R1 to the inverting input terminal, and the black-and-white signal W.B is applied at an input terminal 8b through the resistor R2 to the inverting input terminal. The output is applied through a resistor R3 to the inverting input terminal.

The composite signal shown in FIG. 3(c) has a broad frequency band including a direct current component. For transmitting this directly to the receiving side, a channel of a broad band from the direct current component to a high frequency is required. However, this is generally demodulated into a form suitable for transmission, since many channels do not transmit direct current components and the transmitting bands for them are limited.

In the present invention, the AM three-value system is utilized for transmission wherein band compression for analog signals is possible and the transmission time is decreased to approximately half that of the general amplitude demodulation system.

In order to accomplish this, a converting circuit 2 converts the composite signal shown in FIG. 3(c) into a three-value signal, as shown in FIG. 3(d). The three-value signal shown in FIG. 3(d) is transmitted to the telephone circuit, varying the polarity regularly as $+1$, $0$, $-1$, $0$, and $+1$ when the positive polarity is $+1$ and the negative polarity is $-1$. Therefore, the frequency is made smaller, and the transmitting time is decreased to approximately half.

The three-value signal shown in FIG. 3(d) is amplitude modulated by a modulating circuit 3 and is sent to a telephone circuit.

At the receiving side, the transmitted signal from the telephone circuit is demodulated by a demodulating circuit 4 as shown in FIG. 2(b). Thereafter, the three-value signal is converted into a binary signal by a converting circuit 5, and a composite signal as shown in FIG. 3(c) is taken out. The composite signal wave is applied to a level detecting circuit 6 and the red color signal R is extracted.

Figure 2:
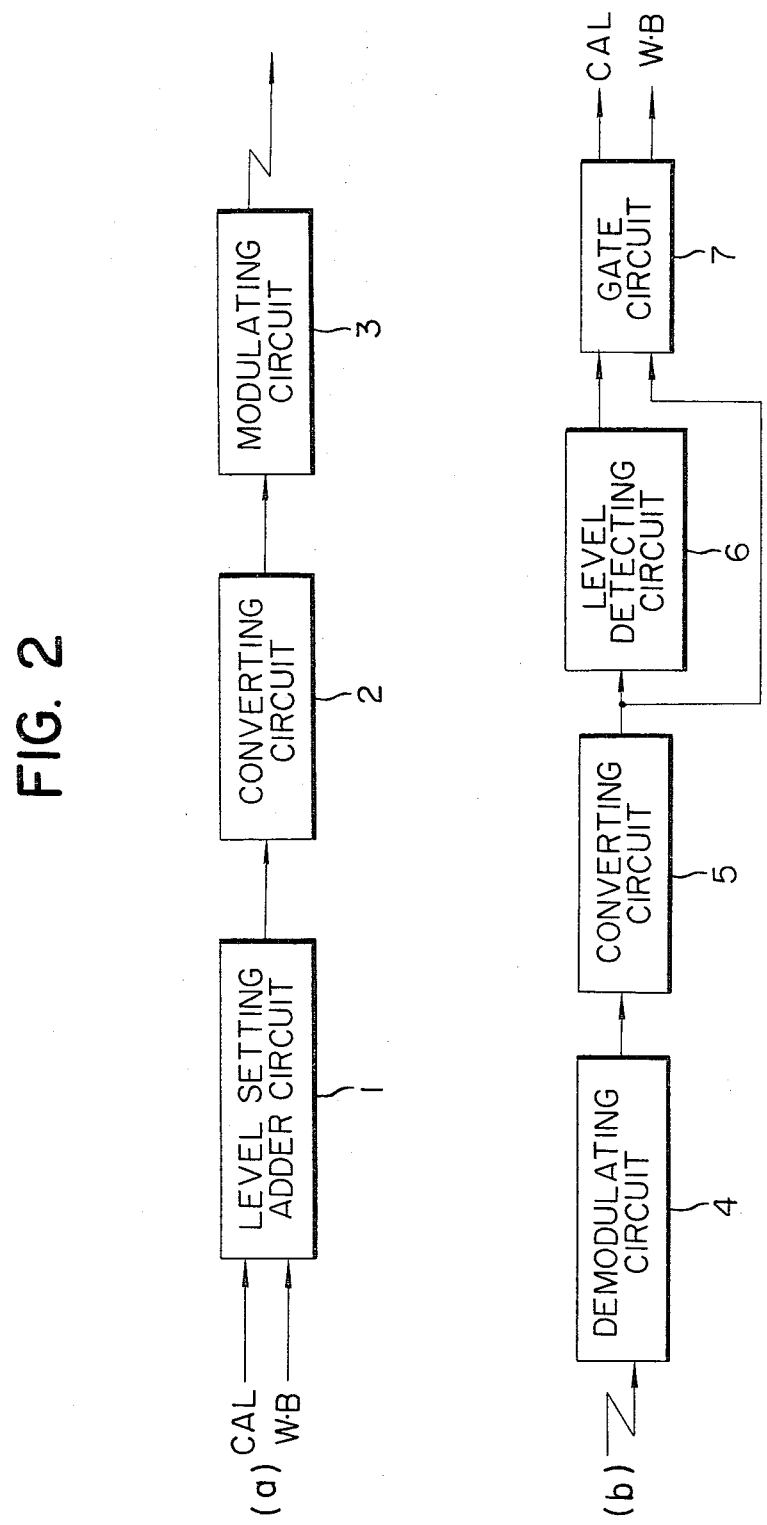
FIG. 2 is a flow chart of a color facsimile signal transmission system according to one embodiment of the present invention.
Figure 5:
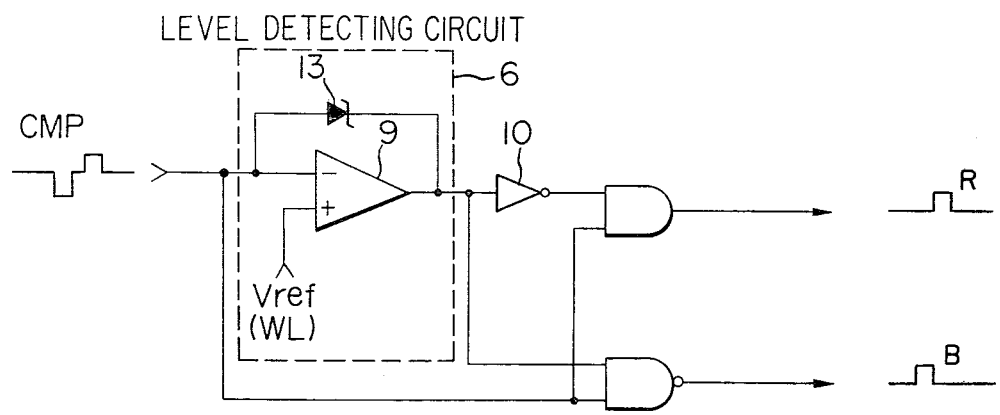
FIG. 5 shows the level detecting circuit and the gate circuit of FIG. 2.

FIG. 5 shows the constructions of the level detecting circuit 6 and a gate circuit 7 as shown in FIG. 2. In this level detecting circuit 6, the composite signal CMP is applied to the inverting input terminal of an operational amplifier 9, a reference voltage (white signal level WL) is applied to a non-inverting input terminal, and a Zener diode 13 is connected between the output terminal and the inverting terminal of the operational amplifier 9. The gate circuit 7 comprises an AND gate 11 a NAND gate 12; to one terminal of each is applied, through an inverter 10 or directly, respectively, the output of the operational amplifier 9. The composite signal CMP is applied to the other input terminals of the AND gate 11 and the NAND gate 12.

The level detecting circuit 6 operates to compare the applied composite signal CMP with a reference voltage $V_{ref}$ (white signal level WL) and the operational amplifier 9 outputs only when the applied signal is lower than the reference voltage. When there is no output from the operational amplifier 9, the output inverted at the inverter 10 is applied to the AND gate 11 which outputs the red color signal R. When the low level signal of the composite signal CMP and the low level signal of the operational amplifier 9 are applied to the NAND gate 12, it outputs the black color signal B. These signals are applied to a suitable recording means (not shown) and recorded.

Therefore, in FIG. 2, the red color signal is set at a level higher than that of the black-and-white signal so as to derive a composite signal. This composite signal is three-value AM demodulated to be transmitted. Accordingly, the original image in red alone or in black-and-white alone can be transmitted by a single device and can be transmitted within the same period of time as the three-value modulation system.

Other embodiments can be easily realized for transmitting multi-color signals instead of a red color signal alone wherein, when setting the levels at the tramsmitting side, a suitable level is set for each color, and at the receiving side, a level detecting circuit is prepared for each color.

In still further applications of the present invention, information about neutral tints may be obtained by setting the levels of the neutral tints between the black-and-white signal levels.

In summary, the advantage of the present invention is tremendous in that color information can be transmitted in a system which can also be used for transmitting black-and-white information, the transmitting time is the same as for black-and-white information using the AM three-value system, and the devices for the transmitting side and the receiving side can comprise circuits of simpler construction.

What is claimed is:

1. A color facsimile signal transmission system wherein the transmitting side comprises means for setting a color signal at a level higher than that of a black-and-white signal, means for combining said color signal and said black-and-white signal to form a composite signal wherein said color signal is superimposed upon said black-and-white signal, means for converting said composite signal into a three-value signal, and means for modulating and transmitting said three-value signal; and the receiving side comprises means for receiving and demodulating said transmitted three-value signal, means for converting said demodulated three-value signal into a binary signal, and means for detecting the level of said binary signal and for separating said color signal and said black-and-white signal therefrom.

2. A color facsimile signal transmission system as claimed in claim 1 wherein said combining means has one differential input operational amplifier whose non-inverting input terminal is grounded and whose output is applied through a resistor to the inverting input terminal thereof, and said color signal and said black-and-white signal are, respectively, applied through a resistor to said inverting input terminal thereof.

3. A color facsimile transmission system as claimed in claim 1 wherein said means for separating said color signal and said black-and-white signal comprises a differential input operational amplifier constituting a comparator, to the non-inverting input terminal of which is applied a white signal level, and whose output is applied through a Zener diode to the inverting input terminal thereof, an AND gate to one terminal of which is applied the output of said operational amplifier through an inverter, and a NAND gate to one terminal of which is directly applied said output; and wherein said signal converted into a binary signal is applied to said inverting input terminal of said operational amplifier and to the other input terminals of said AND gate and said NAND gate, said AND gate outputs said color signal and said NAND gate outputs said black-and-white signal.

* * * * *